United States Patent
Spindler et al.

(10) Patent No.: US 8,515,664 B2
(45) Date of Patent: Aug. 20, 2013

(54) DIGITAL MAP SIGNPOST SYSTEM

(75) Inventors: Carsten-Christian Spindler, Karlsruhe (DE); Martin Fischer, München (DE); Vladimir Ivanov, München (DE); Simon Schütz, Stuttgart (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/426,360

(22) Filed: Mar. 21, 2012

(65) Prior Publication Data

US 2012/0245849 A1    Sep. 27, 2012

(30) Foreign Application Priority Data

Mar. 22, 2011  (EP) ..................... 11002352

(51) Int. Cl.
*G01C 21/00*    (2006.01)
*G08G 1/123*    (2006.01)

(52) U.S. Cl.
USPC ......................... 701/410; 340/995.2

(58) Field of Classification Search
USPC ......... 701/400–541; 340/988–996; 345/419, 345/422
See application file for complete search history.

(56) References Cited

U.S. PATENT DOCUMENTS

| | | | |
|---|---|---|---|
| 5,684,940 A | 11/1997 | Freeman et al. | 395/138 |
| 6,360,168 B1 * | 3/2002 | Shimabara | 701/436 |
| 6,565,610 B1 | 5/2003 | Wang et al. | 715/517 |
| 2005/0052413 A1 | 3/2005 | Ueno | 345/158 |
| 2006/0152503 A1 | 7/2006 | Lee et al. | 345/419 |
| 2007/0021911 A1 | 1/2007 | Kikuchi et al. | 701/211 |
| 2007/0192020 A1 * | 8/2007 | Brulle-Drews et al. | 701/200 |
| 2007/0229513 A1 | 10/2007 | Bowman | 345/467 |
| 2008/0021644 A1 * | 1/2008 | Meyer | 701/211 |
| 2008/0198162 A1 | 8/2008 | Ni | 345/442 |
| 2008/0208450 A1 | 8/2008 | Katzer | 701/201 |
| 2008/0298162 A1 | 12/2008 | Passoni | 366/111 |
| 2010/0085350 A1 | 4/2010 | Mishra et al. | 345/419 |
| 2010/0280747 A1 | 11/2010 | Achthoven | 701/200 |

FOREIGN PATENT DOCUMENTS

| | | |
|---|---|---|
| DE | 10 2006 059 922 A1 | 6/2008 |
| DE | 102008036748 A1 | 10/2009 |
| EP | 0652418 A1 | 5/1995 |
| EP | 0829823 A2 | 3/1998 |
| EP | 0940795 A2 | 9/1999 |
| EP | 1 024 467 A2 | 8/2000 |
| EP | 1 189 176 A2 | 3/2002 |

(Continued)

OTHER PUBLICATIONS

Office Action, dated Oct. 25, 2012, pp. 1-15, U.S. Appl. No. 13/426,304, U.S. Patent and Trademark Office, Virginia.

(Continued)

*Primary Examiner* — Muhammad Shafi
(74) *Attorney, Agent, or Firm* — Brinks Hofer Gilson & Lione

(57) ABSTRACT

A navigation system includes a display for displaying at least a part of a digital map. The navigation system includes a navigation database which stores any text and/or symbol(s) associated with a signpost independently from a background of the signpost. The text and/or symbol(s) and the background may be retrieved from the navigation database and displayed as a signpost image in the displayed part of the digital map.

22 Claims, 4 Drawing Sheets

(56) References Cited

FOREIGN PATENT DOCUMENTS

| EP | 1241445 | A2 | 9/2002 |
| EP | 1710713 | A1 | 10/2006 |
| EP | 1 746 391 | A1 | 1/2007 |
| EP | 2273337 | A2 | 1/2011 |
| JP | 08194432 | A | 7/1996 |
| JP | 2000029450 | A | 1/2000 |
| JP | 2007085863 | A | 4/2007 |

OTHER PUBLICATIONS

European Search Report issued in European Patent Application No. 11002352.0, dated Aug. 9, 2011.

Office Action, dated Mar. 7, 2013, pp. 1-20, U.S. Appl. No. 13/426,304, U.S. Patent and Trademark Office, Virginia.

* cited by examiner

DIGITAL MAP SIGNPOST SYSTEM

PRIORITY CLAIM

This application claims the benefit of priority from European Patent Application No. 11 002 352.0, filed Mar. 22, 2011, which is incorporated by reference.

BACKGROUND OF THE INVENTION

1. Technical Field

The present invention relates to digital maps that can be used for route guidance by a navigation system and, in particular, to the management and display of signposts in digital maps.

2. Related Art

The use of navigation systems in vehicles is becoming increasingly prevalent. Typically, on-board navigation computer systems analyze the combined data provided by GPS (global positioning system), motion sensors such as ABS (anti-lock braking system) wheel sensors, and a digital map to determine the actual position and velocity of a vehicle with increasing preciseness.

Navigation systems typically use electronic digital maps to represent cartographic features, such as streets, buildings and rivers, and store the data that relates to the cartographic features on a compact disk or a digital video disc. After performing a map matching algorithm, the actual position of the user may be indicated in the digital map. By acoustic and/or visual information, the user may be guided to a predetermined destination.

Some navigation systems are able to display detailed digital maps indicating routes to destinations, the types of maneuvers to be taken at various locations such as intersections as well as different kinds of points of interest (e.g., gas stations, restaurants and signposts). As the vehicle changes position, either the vehicle position mark on the displayed image changes or the digital map may be scrolled while the vehicle position mark is fixed at a predetermined position.

SUMMARY

The system stores a background of a signpost independently from the informational content of the signpost such that data storage demand (memory requirements) for a particular signpost at a particular memory location can be reduced. Signposts are signs in the physical environment (e.g., positioned at a highway intersection) that indicate the direction to a particular location, a number of a road, and/or a number of a road branching at an intersection.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
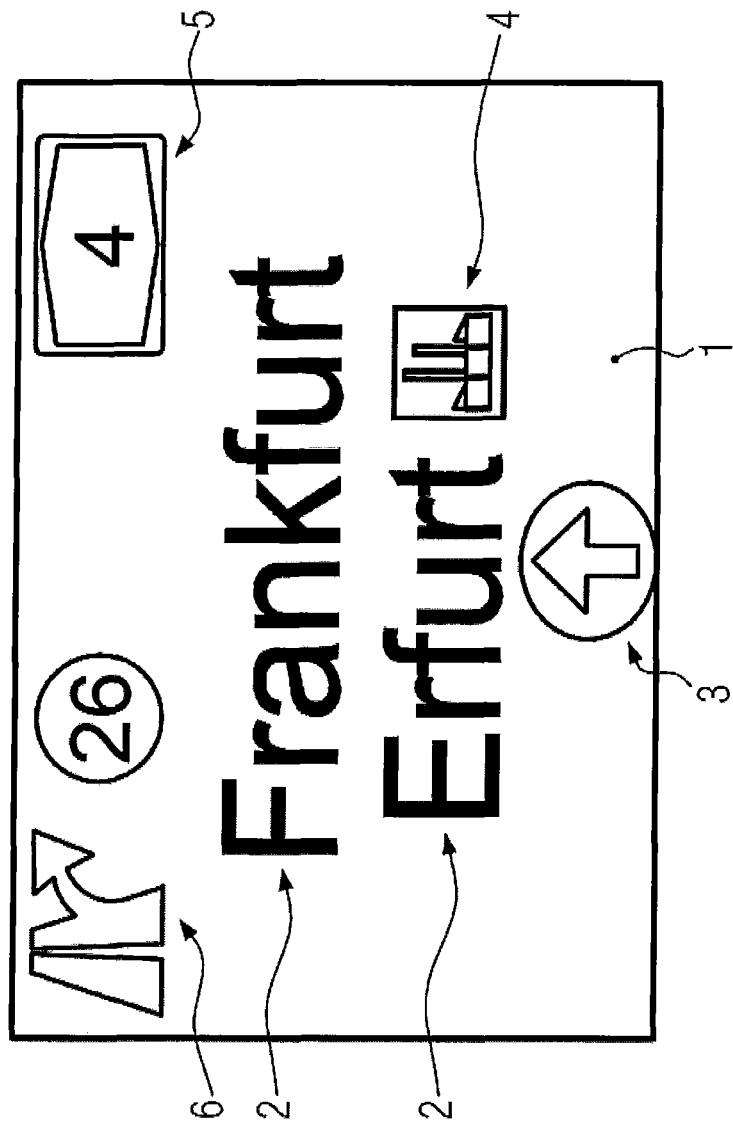
FIG. 1 illustrates one example of a signpost for a digital map.

Navigating in unfamiliar road environments is a common and demanding task that drivers are sometimes forced to undertake. The resulting navigational uncertainty may manifest itself in a number of ways. For example, the uncertainty may lead to stress and frustration for the driver, the driver's relationship with other road users (e.g., misleading use of signals, sudden braking), or the traffic system as a whole (e.g., poor route choices, missed turns). The use of signposts (i.e., posts giving information for guidance) is essential for optimal human navigation. As used herein, the terms 'road' and 'street' are used in an interchangeable manner.

A navigation system of a vehicle may determine the location of the vehicle and display at least part of a digital map representing a surrounding area of the determined vehicle location. More elaborated navigation systems provide enlarged views, for example, of intersections on the guide route where the driver should turn in order to help the driver to identify the route to be taken to the predetermined destination more accurately. The displayed images represent simplified synthesized views from the driver's perspective. However, a two-dimensional representation can confuse the driver, in particular, if roads are intersecting at different height levels or in rotary turns with roads in close proximity.

Recently, various navigation systems have been developed that have provided algorithms for transforming data from a geographic database into a three-dimensional perspective view which, in principle, is much more easily understood by many drivers. Elaborated systems may allow for displaying the intersection approached by the vehicle at variable angles relative to the road depending on the complexity of the intersection.

The navigation system may also display a signpost within a displayed area depending on a location of the signpost with respect to the determined location of the vehicle. Signposts may include large signs displaying, among other things, the direction to a destination such as a city, signpost icons in form of a graphic representation of facilities as an industrial area or airport, road number icons indicating the number of a road or highway, an exit number icon indicating the road number of a road branching at an intersection.

In order to provide the navigation functions, a navigation system may make use of one or more detailed databases that include data which may represent physical features of a geographic region. The navigation database may include a main image file that includes images, such as bitmap images or vector graphics consisting, for example, of a bitmap of the road geometry, signposts, the sky-line, and the like.

Since signposts provide much information to a user of a digital map, they may be expensive in terms of computational resources. The storage, management and display of signposts in the context of digital maps and electronically aided navigation may be a demanding task, in particular, with respect to the implementation in embedded systems with limited computational resources, such as in vehicle navigation systems. The correct display of a signpost in real time navigation is, however, important for a user of a navigation system in order be able to make timely decisions regarding turns to be taken, directions to be changed, or the like.

FIG. 1 illustrates an example of a signpost for a digital map that can be generated and displayed with the navigation system. The signpost may include text and symbols (icons) and a background 1 of the signpost. A text may include, but is not limited to, a city name, a street name, a building name such as a hospital, a name of a park or recreational site, or the like. An icon may include, but is not limited to, a directional icon such as an arrow, an icon representing a geographical location icon such as a hospital or airport, a brand icon identifying a particular restaurant, or the like. In the example of FIG. 1, the signpost includes signpost text 2 indicating the names of cities that can be reached on the highway upon which the signpost may be positioned. The signpost also includes an arrow sign 3 indicating the direction to the cities named by the signpost text 2. The signpost, furthermore, can include a signpost icon 4 indicating an industrial area, a road number icon 5 and an exit number icon 6. The road number icon 5 indicates the number of a road, in the example shown, the icon indicates the road is part of the German Autobahn. The exit number icon 6 indicates the number of an exit from a road, in the shown example, of the German Autobahn. All of the elements may be stored separately in a navigation database.

In one example, a background may be provided in the predetermined format, such as a PNG (portable network graphics) format. The background may be stored separately from any texts or icons. In other examples, other storage formats such as GIF (graphics interchange format) and TIFF (tagged image file format) formats may be employed. For image editing, PNG provides a useful format for the storage of intermediate stages of editing. Compression in the PNG format is fully lossless. PNG supports up to 48-bit true color or 16-bit grayscale and, thus saving, restoring and re-saving an image will not degrade its quality, unlike, for example, the JPEG (Joint Photographic Experts Group) format. Like GIF and TIFF, PNG is a raster format and represents an image as a two-dimensional array of colored dots or pixels.

The predetermined format may include one or more image formats. For example, PNG supports three main image types: true color, grayscale and palette-based. The predetermined format may also provide an integrity checking function to help avoid problems with file transfers and the like. For example, PNG supports three main types of integrity-checking. The first and simplest is the eight-byte magic signature at the beginning of every PNG image. The second type of integrity-checking is known as a 32-bit cyclic redundancy check. The third type of integrity check applies only to the image-data chunks and is similar to the cyclic redundancy check, in principle.

Figure 2:
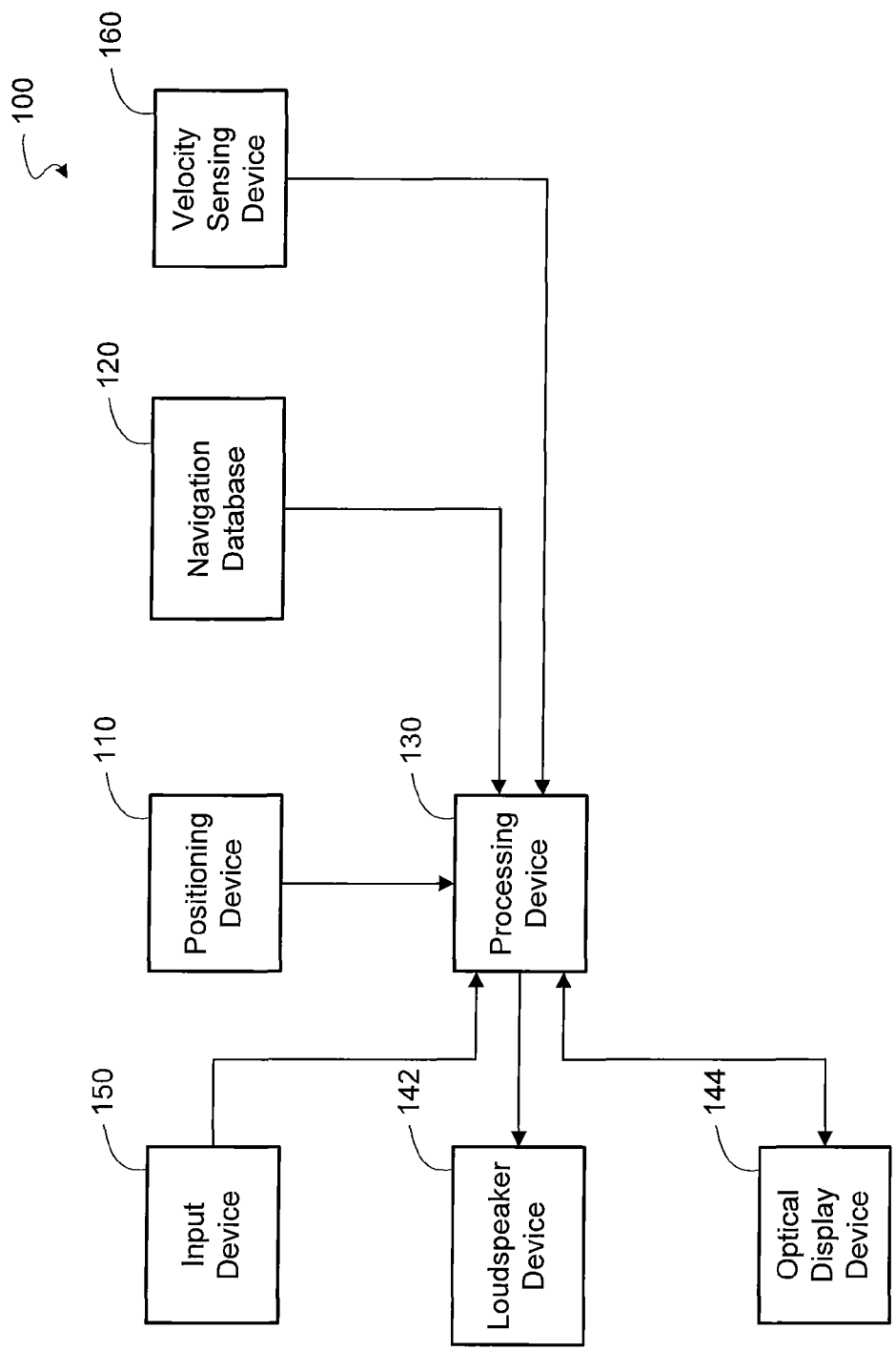
FIG. 2 illustrates a block diagram of one example of a navigation system for use in a vehicle.

FIG. 2 is a block diagram of an example navigation system 100 configured for use in a vehicle, such as an automobile, a boat, an airplane, or any other passenger carrying conveyance. The navigation system 100 may include and/or be interfaced to various devices and/or systems. The navigation system 100 may be a stand alone device, one or more components integrated and or cooperatively operating with an operating system, such as an operating system of a vehicle, or a combination of multiple distributed components, such as a user interface at a user location, and a remotely located computing device, such as a server communicating over a network, or a computing device in a vehicle in communication with the user interface. Thus, the location of the functionality of the navigation system 100 may be locally provided at a user location, or distributed and in communication over a wireline or wireless dedicated or shared network.

The navigation system 100 may include a positioning device 110 which may determine the position of the vehicle in which the navigation system 100 may be installed or operated. For example, the positioning device 110 may include a GPS (global positioning system) receiver or a comparable satellite positioning system receiver for receiving positioning signals from navigation satellites. In other examples, the positioning device may be any other form of mobile positioning system, such as a beacon system, an angle of arrival system, a time of arrival system, or any combination thereof. A digital map representation as well as operating instructions and any other data or instructions related to the navigation system 100 may be stored in a navigation database 120 and/or any other memory or memory device. The navigation database 120 may include, for example, one or more of a hard disk device, a CD-ROM device, a DVD device, a ROM memory device, or any other one or more non-transitory data storage devices. In addition, rewritable non-volatile memory, such as flash memory, may be provided to store date and information in a flexible way and/or to maintain the stored information even in the case of a power outage.

The navigation system 100 may include a processing device 130 for performing operation aspects of the navigation system 100, such as providing navigation information (i.e., visual and/or audio output) to the vehicle user (e.g., the driver). The processing device 130 may be configured to include a general processor, a digital signal processor, application specific integrated circuit, field programmable gate array, analog circuit, digital circuit, server processor, combinations thereof, or other now known or later developed processor. The processing device 130 may be configured as a single device or combination of devices, such as associated with a network or distributed processing. Any of various processing strategies may be used, such as multi-processing, multi-tasking, parallel processing, remote processing, centralized processing or the like. The processing device 130 may be responsive to or operable to execute instructions stored as part of software, hardware, integrated circuits, firmware, micro-code, or the like.

The processing device 130 may receive position data from the positioning device 110 and digital map data from the navigation database 120 to determine a current position of the navigation system 100 with respect to the digital map representation. The processing device 130 may generate navigation information on the basis of the current position and/or other received data such as, for example, a destination entered by an occupant of the vehicle. The navigation information may include map data of the area surrounding the current location of the vehicle.

In addition, the navigation information may include navigation instructions such as, for example, indications of which action should be taken to navigate the vehicle on a preselected navigation route (e.g., "turn left", "turn right", or "follow the course of the road"). The navigation information also may include warnings relating to the navigation route. The warnings may include, for example, warnings relating to abnormal road conditions, speed limits, or other conditions.

The navigation system 100 may include various output devices to present or annunciate the navigation information to the driver. The output devices may include a loudspeaker device 142 and/or an optical display device 144. The loudspeaker device 142 may be a dedicated component of the navigation system 100. Alternatively, the loudspeaker device 142 may be a component of a vehicle entertainment system, such as a car radio, CD player, MP3 player, tape player, or a combination of such devices. If the navigation system 100 shares use of the loudspeaker device 142 with a vehicle entertainment system, the navigation system 100 may include an interface to permit transmission of the output signals corresponding to navigation information to the vehicle entertainment signal. This may be accomplished via a communication link such as a digital data bus in the vehicle. The optical display device 144 may be a full graphic display, such as, for example, a liquid-crystal display, a thin-film transistor display, or a cathode-ray tube display. The optical display device 144 also may be a projection display, such as a head-up display in which optical information may be projected onto a windscreen, or other surface of the vehicle. The optical display device 144 also may be combined with one or more input devices. For example, the optical display device 144 may be configured as a touchscreen device. The optical display device 144 may be a dedicated component of the navigation system 100 or may be used together with other vehicle systems, such as, for example, a multi-media system.

The processing device 130 may receive data from various other devices. The processing device 130 may be coupled to the positioning device 110 to receive a position data signal, to the navigation database 120 to receive digital map data, to the loudspeaker device 142 to provide an acoustical output data signal, and/or to the optical display device 144 to provide an optical output data signal. The processing device 130 may evaluate position data received from the positioning device 110 via the position data signal and digital map data received from the navigation database 120 to generate navigation information to be output to the user. The output navigation information may be a corresponding acoustical output signal and/or optical output signal.

Figure 3:
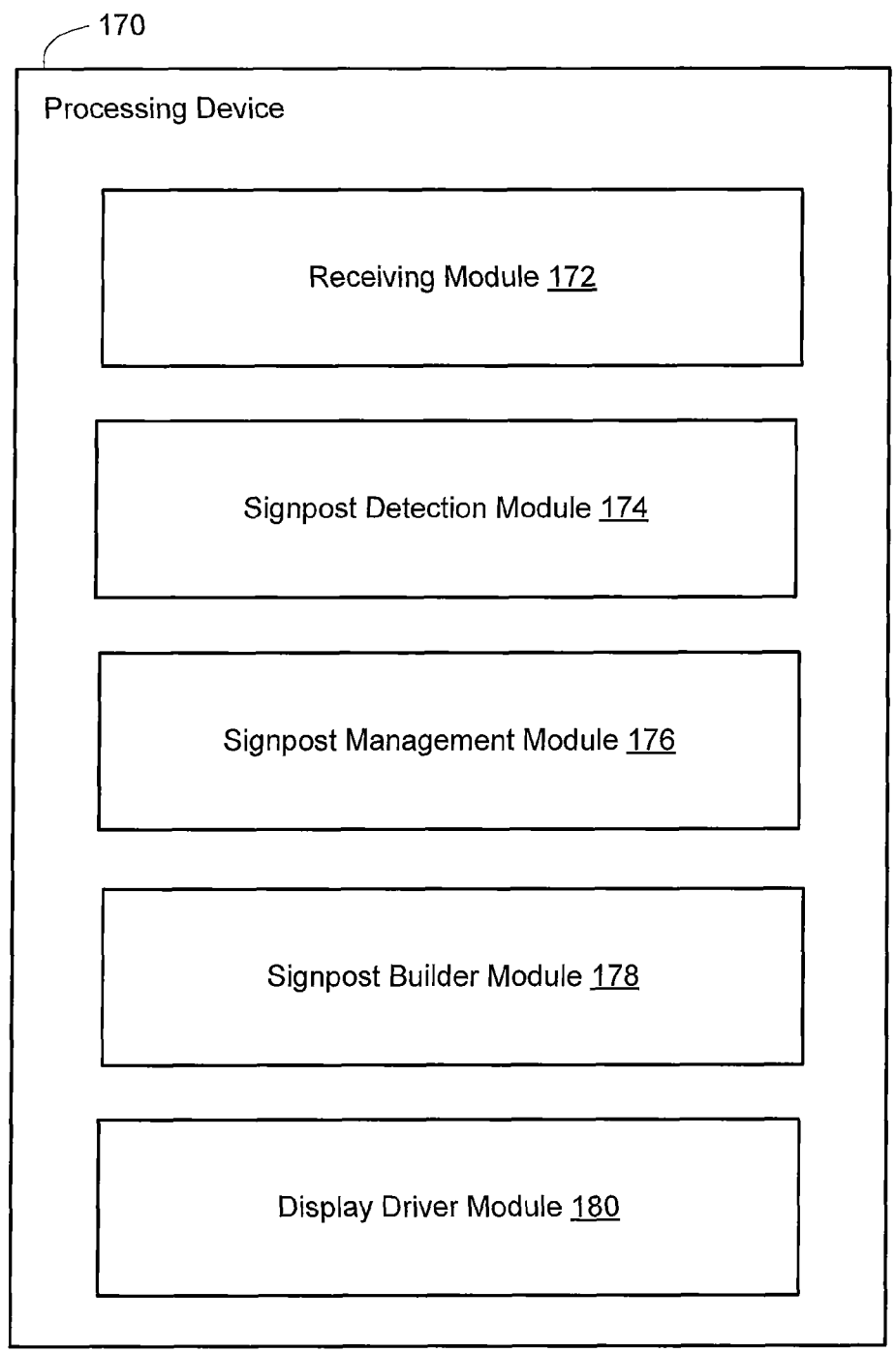
FIG. 3 illustrates a block diagram of one example of a processing device.

For example, as shown in FIG. 3, the processing device 130 may execute a receiving module 172 configured to receive position data from the positioning device 110, digital map data from the navigation database 120, and/or velocity data from the velocity sensing device 160. The processing device 130 may have a signpost detection module 174 configured to determine a signpost based on the received data. The processing device 130 may have a signpost management module 176 configured to retrieve any text or icon elements associated with the signpost from the navigation database 120. In addition, the signpost management module 176 may retrieve a background from the navigation database 120 to be used in generating a signpost image to be displayed to the optical display device 144. The processing device 130 may have a signpost builder module 178 configured to generate an appropriate output image from the retrieved data based on the retrieved text and/or icon elements and the retrieved background. The processing device 130 may also have a display driver module 180 configured to present the signpost to the optical display device 144. The term "module" may be defined to include one or more executable modules. As described herein, the modules are defined to include software, hardware or some combination thereof executable by the processing device 130. Software modules may include instructions stored in the navigation database 120, or any other memory device, that are executable by the processing device 130 or any other processor. Hardware modules may include various devices, components, circuits, gates, circuit boards, and the like that are executable, directed, and/or controlled for performance by the processing device 130.

Referring again to FIG. 2, the navigation system 100 also may include an input device 150. The processing device 130 may be coupled to the input device 150 to provide the vehicle user with control over functions of the processing device 130. The input device 150 may include suitably designed switches, buttons, a microphone for voice commands, a keyboard, and/or any other mechanism or technique for inputting information to the navigation system 100. The input device 150 may be used, for example, to activate or deactivate the navigation system, to select the navigation route, and/or to select between different navigation system output modes. The navigation system 100 output modes may include, for example, a mode providing for acoustic output of navigation information only, a mode providing for optical output of navigation information only, a mode providing for both acoustical and optical output of navigation information, or other suitable modes.

The navigation system 100 may include and/or be interfaced to a velocity sensing device 160 to detect a current velocity of the vehicle. The velocity sensing device 160 may include motion sensors, such as Anti-Lock Braking System (ABS) wheel sensors. These sensors may be positioned in proximity to each individual wheel or within a differential of the vehicle. The processing device 130 may be coupled to the velocity sensing device 160 to receive a velocity data signal. Alternatively, or additionally, the processing device 130 may be configured to calculate the velocity of the vehicle using the position data received from the positioning device 110. The processing device 130 may calculate the velocity by analyzing the change in the position of the vehicle over a period of time. In other examples, any other mechanisms and/or techniques may be used to determine a velocity of the vehicle.

Figure 4:
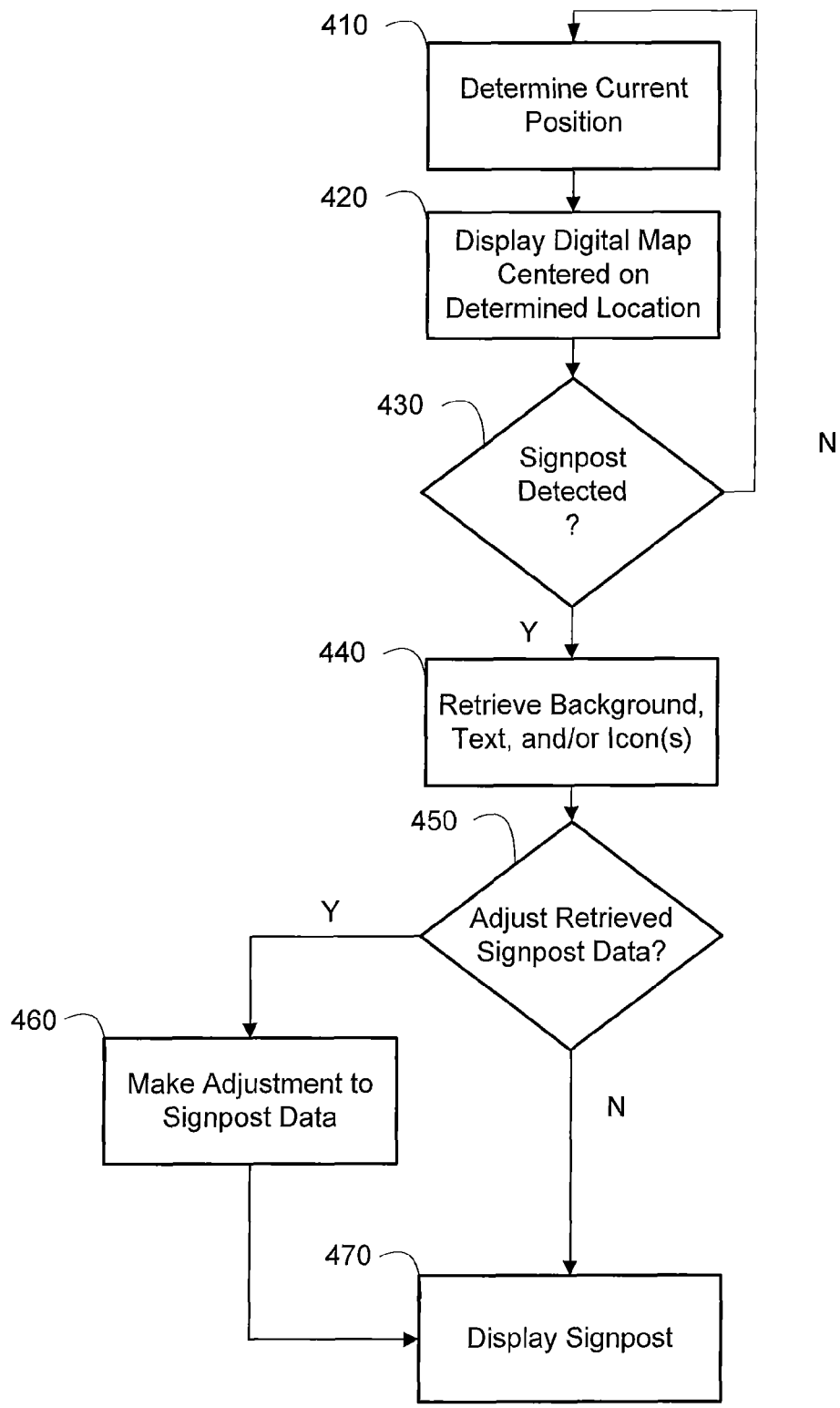
FIG. 4 illustrates a flow diagram of one example method according to an example of the present invention.

FIG. 4 is an example of an example operational flowchart of the navigation system 100. The current position of the navigation system 100 with respect to a digital map representation may be determined by the navigation system 100 (at step 410). Consider a case where a vehicle is on its route recommended by the navigation system 100. The navigation system 100 substantially continuously determines the position of the vehicle by taking into account data received by positioning device 110. A map matching algorithm allows for a relatively precise location of the vehicle in the digital map provided by navigation database 120. Based on the information about the actual position of the vehicle and the driving direction according to the recommended route, the geographical section that can be viewed by the occupants of the vehicle may be calculated. A digital map centered on the current location of the navigation system 100 may be displayed to the occupants of the vehicle (at step 420) via optical display device 144.

Using a map matching algorithm and the digital map provided by the navigation database 120, the signpost detection module 174 may determine whether a signpost is in the forward path of the vehicle according to the predetermined route (at step 430). If no signpost is detected, the navigation system 100 returns to block 410 and continues determining the actual position of the vehicle and displaying a digital map centered on the determined location of the vehicle.

If a signpost is detected at block 430, the signpost management module 176 may retrieve signpost data from the navigation database 120. (at step 440) The signpost data may include data representing separate and independent backgrounds, text and/or icons associated with the signpost. Alternatively, or in addition, signpost data may include any combination of backgrounds, text and/or icons.

The signpost builder module 178 may determine whether adjustments to any of the signpost data is needed at block 450. Determination by the signpost builder 178 whether adjustments to any of the signpost data is needed may be based on assembling the retrieved signpost data in a cache or buffer according to the available display location for the signpost in the navigation map and the nature and dimensions of the signpost upon which the signpost data will be displayed. For example, the processing device 130 may have a signpost builder module 178 configured to generate an appropriate output image from the retrieved data based on the retrieved text and/or icon elements and the retrieved background. In other words, the signpost may be generated from the stored data by compiling the retrieved background and text and/or symbols and displaying the different retrieved data in the form of a signpost. Thus, the navigation system 100 may assemble various different pieces of data to construct a signpost.

Any of the background, icons or text may be dynamically selected, modified or adjusted by the signpost builder module 178. In one example, the background may be dynamically selected from among a number of available backgrounds stored in the navigation database 120 based on the number of items (i.e., text and/or icon(s)) to be displayed on the signpost, the other colors in the navigation map, the time of day, the speed of the vehicle, or any other parameters. The navigation system 100 may determine whether a selected background needs to be modified or adjusted such that the items are displayed appropriately on the signpost (step 450). If so, the selected background can be adjusted accordingly (step 460). For example, the size of the background may be enlarged or reduced to fit the items needing to be displayed. In other examples, the selected background may be replicated by mirroring or interpolation to be increased in size, or may be clipped, or cropped to be reduced in size. In still other examples, the navigation system 100 may cut out portions of the background to allow for other elements, and or to fit the background to the particular signpost. The signpost may then be displayed (step 470). Icons, text, or any other signpost data may similarly be retrieved and modified and displayed.

In addition to dynamic adjustment of the signpost data for purposes of appropriately displaying the signpost data, the signpost builder 178 may also dynamically select different background, text or icons for display based on parameters external to the navigation system. For example, the speed of the vehicle could be monitored, and a red flashing background may be dynamically selected when a vehicle is traveling above a suggested speed for an upcoming route feature, such as a sharp curve on a roadway, or a no wake zone. In another example, flashing text or icons may be dynamically chosen for a signpost for a gas station when the vehicle is low on fuel. In still another example, signage for an exit or upcoming alternate route may be dynamically selected to be flashing or display in a different color than it would otherwise display due to an indication to the navigation system of an accident, a slowdown, road construction, or some other incident that may inhibit desired travel along an the intended navigation route.

In other examples, one or more data links may be stored in the navigation database 120 which link a background and at least one of text or symbol(s) to be displayed on the background. For example, a data link, or linking data may be stored in the navigation database in association with at least one of the text or the symbol. During operation, the signpost management module may retrieve a data link from the navigation database based on at least one of the text or the symbol, and retrieve the background based on the data link. The data link(s) may allow for composing the signpost without the need for dynamically determining the appropriate background for a particular signpost. In other words, a suitable background for a particular signpost may be linked beforehand, for example, to each piece of text and each symbol to be displayed on the background, thereby avoiding the risk of a false assignment of a background when generating a signpost to be displayed.

In one example, position data may be stored in the navigation database 120. The position data may include coordinate values in a digital map. The position of the signpost may be defined by the position data. When the signpost is to be displayed, it may be positioned in the digital map based on the retrieved position data. Other map data of the digital map, such as streets, roads, topology, and buildings may also be stored in the navigation database 120 and retrieved for display.

In some examples, the background of the signpost may be a graphical object showing a transparent, semi-transparent or non-transparent plane or a transparent, semi-transparent or non-transparent three-dimensional body. The plane or the body may be colored or non-colored. Thus, a great variety of signposts with suitable backgrounds can be compiled.

In one example, the digital map can be a three-dimensional map. The signpost itself may be a two-dimensional or three-dimensional signpost. The signpost may be displayed at an intersection. The navigation system 100 may be configured to display detailed three-dimensional animated intersection views. Thus, in the example of a vehicle containing at least part of the navigation system, when vehicle approaches an intersection, a representation of the respective intersection may be provided by an intersection view database, for example, containing references to an animation database storing animated data. The animated data consists of data units that may consist of bitmaps and/or vector graphics and/or metafiles (i.e., combined bitmaps and vector graphics).

The animation data may consist of a temporal sequence of individual static images. The speed at which the animation takes place may depend on the location and speed of the vehicle. The animation data may show perspective views of the approached intersection. In one example, the animation data may include a number of lanes, slopes, branches, crossroads, and the like. Alternatively or in addition, the animation data may include topographical objects as bridges, administrative buildings, signposts, environmental views representing an urban, rural or industrial environment and/or a mountain landscape. Accordingly, the signposts constructed by the navigation system may be included in the animation data.

In one example, the processing device 170 may include a feature view calculation module, such as an intersection view calculation module. The intersection view calculation module of the navigation system 100 may access the animation database to obtain relevant animated feature view data, such as intersection view data. Alternatively, the intersection view calculation module may produce animated data from standard images provided by an animation database and/or an intersection view database and/or a map database.

The animated data can be available in a predetermined format or protocol, such as the Audio Video Interleave Format (AVI). In this case, the AVI data may be provided to an AVI player included in the navigation system, in other examples, any other video player plugin or animation software may be used. During operation, the animation may start and end at predefined respective positions of at least a portion of the navigation system ahead of and after the predetermined feature, such as an intersection. For example the animation may commence as the navigation system approaches an intersection, by cycling through a series of frames of image data at a cycle speed determined by the speed at which the vehicle is traveling, and end after the vehicle leaves the intersection. The signposts constructed with the navigation system may be inserted in the frames of image data. It is highly desirable that the AVI player is synchronized with data provided by a location system determining the actual position of the vehicle. Thereby, the elapsed time is synchronized with the distance the vehicle moves, so that the synthesized animated feature, such as an intersection view, may be displayed on the display device of the navigation system synchronously to the actual position of the vehicle. The icons may represent any of such elements of an animated intersection view.

The positioning of the displayed signpost may also be an important issue. Thus, it may be desirable for the navigation system, such as the display driver module 180, to dynamically determine a portion of a map element where a signpost may be displayed where no overlap with the signpost shall occur or to determine a portion in the vicinity of the map element in the digital map where no overlap with the signpost shall occur. Then, the signpost may be positioned in the digital map such that the portion of the map element and/or the portion in the vicinity of the map element in the digital map are not either partially or completely covered by the signpost.

The map element, in this context, is a graphical element of the map representing a landmark. For example, the map element may include, but is not limited to, a building, a bridge, a statue, a road, a mountain, a river, a lake, or the like. In some examples, the signpost may be displayed such that no overlap occurs with a map element, thereby hiding a portion of the map element. Thus, for example, an intersection in two-dimensional or three-dimensional view can be displayed in a manner that allows that all relevant parts can be completely seen by a user.

The portion of the map element where no, or only a predetermined amount of overlap with the signpost shall occur and/or the portion in the vicinity of the map element in the digital map where no, or only a predetermined amount of overlap with the signpost shall occur can be determined by the display driver module 180 based on coordinates provided for the digital map. Thereby, a substantially exact positioning of the signpost is made possible. Thus, it is possible to determine coordinate values of a point of the map element and the portion of the map element where no, or only a predetermined amount of overlap with the signpost shall occur and/or the portion in the vicinity of the map element in the digital map where no, or only a predetermined amount of overlap with the signpost shall occur can be determined based on the determined coordinate values. The coordinate values can be stored in a database of the navigation system 100.

In one example, a portion of the map element in the digital map where no overlap with signpost shall occur and/or a portion of the map element in the vicinity of the map element where no overlap with the signpost shall occur can, particularly, be determined by a radius defined about the coordinates with the determined coordinate values. For example, a radius may be determined about a coordinate of a central point of the map element. Information on the coordinate values of such coordinates may also be stored in the database of the navigation system 100.

The digital map may include entire street networks in a substantially two-dimensional representation. In such maps, height information of streets may only be given as information on the relative height of a particular street with respect to crossing street vectors in order to allow for a representation in the appropriate order with respect to the spatial depth. Alternatively, the digital map used may be a three-dimensional digital map generated based on a terrain model, such as a digital model obtained by laser-scanning.

Topographic terrain models may be provided by official institutions as well as commercial providers. In principle, a digital terrain model is a digital file consisting of terrain elevations for ground positions at regularly or irregularly spaced horizontal intervals. Digital terrain products may be used in the generation of three-dimensional digital maps displaying terrain slope including the direction of slope and terrain profiles between selected points.

In some examples, the signposts may be variable in geometric shape. In particular, the geometric shape of the signposts may not be restricted to conventional rectangular shapes, but rather the geometric shape of the signposts may be adapted by the signpost builder module 178 such that the signpost fits to map elements that are provided with the signpost or to map elements in the vicinity of the displayed signpost. This feature may be of particular use in the context of three-dimensional map views but may also be advantageous in the context of any two-dimensional digital map presentation.

Thus, a signpost may be assigned to a map element, for example, part of a lane, street or intersection, and the map element as well as the signpost can be displayed in the digital map based on stored coordinate values such that the signpost is adapted somewhat to the geometric form of the map element. In some more detail, consider a case where a map element, for example, part of a lane, street or intersection, may be represented by means of a spline, the vertices used for the representation can also be used for the positioning of the signpost. The map element, in general, may be defined by a list of points (coordinates) or vectors that can be used for positioning the signpost such that it can be displayed in a manner such that its shape (geometrical form) may be adapted to the shape (geometrical form) of the displayed map element.

When, for example, m−1 vertices (knots) $t_i$, i=0, . . . , m, are used for the representation of the map element, these vertices are associated with coordinates $(x_i, y_i)$ in the digital map (or $(x_i, y_i, z_i)$ in the case of a three-dimensional digital map. Coordinates for positioning the signpost may be derived from the coordinates of vertices used for the spline(s). Accordingly, coordinates corresponding to (derived from) the ones of the vertices used for the spline representation of the map element can be used for the representation of the signpost. For example, a number of the vertices can be chosen and coordinates shifted to some degree with respect to the coordinates of the vertices $(x_i+d_x, y_i+d_y)$. The shift may be based on constants $d_x$ and $d_y$, where constants $d_x$ and $d_y$ can be independently stored for the generation of the signpost. For example, the constants $d_x$ and $d_y$ may be stored in connection with the signpost and/or the location, so the constants $d_x$ and $d_y$ can be used during the generation of one or more splines by which the signpost can be generated. Thereby, a signpost constituted by a background and characters and/or symbols and/or icons all following substantially the geometric shape (curve) or the outer contour of the map element can be displayed in the digital map in order to guide a user in an unequivocal manner without hiding parts of map elements that are useful for the route guidance and while still clearly indicating the route by means of the signposts.

A map element may be represented as a linear combination of B-splines (basis splines) of that same degree and smoothness. For example, a (cubic) Catmull-Rom spline can be employed. According to another example, B-splines can be evaluated by the well-known (Cox) de Boor algorithm. For a given non-decreasing sequence of m−1 vertices (knots) $t_i$, i=0, m, a B-spline of degree n is a parametric curve composed of $$C(t) = \sum_{i=1}^{m} P_i b_{i,n}(t)$$

where $P_i$ are control points and $b_{i,n}$ are basis functions defined by the recursion $$b_{i,0}(t) = \begin{cases} 1, & \text{if } t_i \leq t \leq t_{i+1} \\ 0, & \text{else} \end{cases}$$

$$b_{i,n}(t) = \frac{t - t_i}{t_{i+n} - t_i} b_{i,n-1}(t) + \frac{t_{i+n+1} - t}{t_{i+n+1} - t_{i+1}} b_{i+1,n-1}(t)$$

The curve may be completely contained in the convex hull of its control points provided that basis functions all have the same sign (which usually is chosen positive). When the knots are equidistant, the B-splines are called uniform B-splines. The basis functions $b_{i,n}$ determine how strongly control points $P_i$ influence the curve. The stored raster points that form a subset of the raster points of a provided digital terrain model, for example, may be directly used as the control points $P_i$. Alternatively, a distance of these raster points to corresponding points of the three-dimensional B-spline surfaces (patches) may be minimized.

When the number of knots equals the degree of the B-spline, the latter represents a Bezier curve. Examples of B-splines that can be used include a constant spline, such as the constant B-spline (the most simple spline) with $b_{i,n}$ chosen as $b_{i,0}$, and the linear B-spline with $$b_{i,1}(t) = \begin{cases} \frac{t - t_i}{t_{i+1} - t_i}, & \text{if } t_i \leq t \leq t_{i+1} \\ \frac{t_{i+2} - t}{t_{i+2} - t_{i+1}}, & \text{if } t_{i+1} \leq t \leq t_{i+2} \\ 0, & \text{else}. \end{cases}$$

Whereas the constant and linear B-splines are rather simple, a more satisfying interpolation can be obtained by uniform quadratic and uniform cubic B-splines. Uniform quadratic splines are calculated in matrix form for the i+1-th segment of the curve C by:

$$C_i(t) = [t^2 \, t \, 1] \frac{1}{2} \begin{bmatrix} 1 & -2 & 1 \\ -2 & 2 & 0 \\ 1 & 1 & 0 \end{bmatrix} \begin{bmatrix} p_i \\ p_{i+1} \\ p_{i+2} \end{bmatrix}$$

and uniform cubic ones by:

$$C_i(t) = [t^3 \, t^2 \, t \, 1] \frac{1}{6} \begin{bmatrix} -1 & 3 & -3 & 1 \\ 3 & -6 & 3 & 0 \\ -3 & 0 & 3 & 0 \\ 1 & 4 & 1 & 0 \end{bmatrix} \begin{bmatrix} p_i \\ p_{i+1} \\ p_{i+2} \\ p_{i+3} \end{bmatrix}.$$

The splines may be generated by means of vertices (knots) and coordinate values may be stored corresponding to the coordinate values of the coordinates of the vertices. In one example, instead of the coordinate values of the vertices themselves being stored for the appropriate positioning and generation/display of the signpost, different coordinate values that are determined based on that coordinate values may be stored. If, for example, three vertices with coordinates $(x_1, y_1)$, $(x_2, y_2)$, and $(x_3, y_3)$ are used for drawing the map element that may be provided with a signpost, coordinates $(x_1+d_x, y_1+d_y)$, $(x_2+d_x, y_2+d_y)$ and $(x_3+d_x, y_3+d_y)$ can be used for the positioning of the signpost, where $d_x$ and $d_y$ are constants by which the coordinate values of the vertices are shifted. Thereby, particularly, the displayed signpost can be adapted to the geometrical shape of a map element. However, the coordinates $(x_1, y_1)$, $(x_2, y_2)$ and $(x_3, y_3)$ themselves may be stored and subsequently retrieved for the process of positioning the signpost.

The navigation system 100 need not be related to an automobile but can be used with any type of platform including, but not limited to, a ship, a boat, an aircraft, a pedestrian, a cyclist, or a hiker.

The foregoing description of implementations has been presented for purposes of illustration and description. It is not exhaustive and does not limit the precise form disclosed. Modifications and variations are possible in light of the above description or may be acquired from practicing the invention. For example, one or more processes, sub-processes, or process steps may be performed by hardware and/or software. Additionally, the navigation system 100, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory, such as a memory in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any tangible signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," and/or "computer-readable medium," is any tangible means that may contain or store the program for use by or in connection with the instruction execution system, apparatus, or device. The computer readable medium may selectively be, for example but not limited to, an electronic, magnetic, optical, electromagnetic, infrared, or semiconductor system, apparatus, or device. More specific examples, but nonetheless a non-exhaustive list, of computer-readable media would include the following: a portable computer diskette (magnetic); a RAM (electronic); a read-only memory "ROM" (electronic); an erasable programmable read-only memory (EPROM or Flash memory) (electronic); and a portable compact disc read-only memory "CDROM" "DVD" (optical). Note also that the implementation may vary between systems. Accordingly, the invention is not to be restricted except in light of the attached claims and their equivalents.

We claim:

1. A method for managing signposts in a navigation system, comprising:

storing a text and a symbol associated with a signpost in a navigation database stored in a memory device;

storing a background associated with the signpost in the navigation database independently from the text and the symbol, the background being a three-dimensional body;

determining, by a processor, navigation information based on current position of the navigation system;

receiving, by the processor, a vehicle information parameter from a vehicle in which the navigation system is installed, the vehicle information parameter being related to a fuel level in the vehicle;

dynamically retrieving, with the processor, from the navigation database, at least one of the text, the symbol, or the background, based on the navigation information and the vehicle information parameter;

assembling, with the processor, at least one of the text or the symbol, and the background into the signpost; and displaying, with a display device, the signpost on a digital map.

2. The method of claim 1, where the text comprises the name of a city and the symbol comprises one of a road number icon, a signpost icon, or an exit number icon.

3. The method of claim 1, further comprising storing in the navigation database a data link, where the data link provides a link between the background and the text and the symbol.

4. The method of claim 1, further comprising storing position data in the navigation database, the position data linking at least one of the background, the text, or the symbol to the digital map, where the position data comprises a coordinate value in the digital map.

5. The method of claim 1, where the digital map is a three-dimensional map.

6. The method of claim 1, further comprising:

dynamically determining an available display location for the signpost on the digital map, where the available display location is outside of at least one of a portion of a map element where no overlap with the signpost shall occur or a portion of a digital map in the vicinity of the map element where no overlap with the signpost shall occur; and displaying the signpost on the digital map at the available display location.

7. The method of claim 6, further comprising assembling the signpost according to the available display location for the signpost in the digital map and dimensions of the signpost.

8. The method of claim 6, where the navigation system is a vehicle navigation system, and the method further comprises displaying guidance information that includes the signpost on the display device.

9. A navigation system, comprising:

a memory device configured to store a navigation database;

the navigation database configured to include data of a text and a symbol of a three-dimensional signpost;

the navigation database further configured to include data of a background of the three-dimensional signpost in the navigation database, the background of the three-dimensional signpost being a three-dimensional image included in the navigation database independently from the data of the text and the symbol;

the navigation database further configured to include linking data that is a reference between the data of the text and the symbol of the three-dimensional signpost, and the data of the background of the three-dimensional signpost;

a processor in communication with the memory device and a vehicle in which the navigation system operates;

a signpost management module executable by the processor to retrieve at least one of the text, the symbol, or the background based on at least one vehicle information parameter related to a fuel level in the vehicle;

a signpost builder module executable by the processor to generate the three-dimensional signpost based on the at least one of the text, the symbol, or the background; and a display driver module executable by the processor to display the three-dimensional signpost in a digital map.

10. The navigation system of claim 9, where the signpost management module is further executable by the processor to retrieve a data link from the navigation database based on the at least one of the text or the symbol, and retrieve the background based on the data link.

11. The navigation system of claim 9, where the display driver module is further executable by the processor to receive a position data and display the three-dimensional signpost in the digital map based on the position data.

12. The navigation system of claim 11, where the position data comprises one or more coordinate values included in the digital map.

13. The navigation system of claim 9, where the display driver module is further executable by the processor to change a size of the background based on the at least one of the text or the symbol.

14. The navigation system of claim 9, further comprising an intersection view calculation module executable by the processor to generate an animated intersection view, and the display driver module is further executable by the processor to display the animated intersection view.

15. The navigation system of claim 9, where the display driver module is further executable by the processor to dynamically determine a display location of the three-dimensional signpost in the digital map, and the display location is outside of at least one of a portion of a map element where no overlap with the signpost shall occur or a portion of a digital map in the vicinity of the map element where no overlap with the signpost shall occur.

16. A method for managing signposts in a navigation system, the method comprising:

storing at least one of a text or a symbol of a signpost in a navigation database, the navigation database stored on a memory device;

storing independently from the at least one of the text or the symbol a background of the signpost in the navigation database;

retrieving the at least one of the text or the symbol from the navigation database by a processor;

retrieving the background of the signpost from the navigation database by the processor;

determining by the processor at least one of a portion of a map element of the digital map where no signpost shall be positioned or a vicinity around the map element in the digital map where no signpost shall be positioned; and displaying, on a display unit, the signpost in a digital map by the processor based on the retrieved at least one of the text or the symbol and the retrieved background of the signpost such that the at least one of the portion of the map element where no signpost shall be positioned, or the vicinity around the map element in the digital map where no signpost shall be positioned, is not covered by the signpost.

17. The method of claim 16, where displaying the signpost comprises displaying the signpost for route guidance in a vehicle navigation system, and the method further comprises providing guidance information to a user of the navigation system.

18. A navigation system comprising:

a navigation database stored in a memory device, the navigation database configured to include data of a digital map, data of a text and a symbol of a signpost, and data of a background of the signpost, the data of the background of the signpost included in the navigation database independently from the data of the text and the symbol of the signpost;

the navigation database further configured to include data referencing between the data of at least one of the text or the symbol of the signpost and the data of the background of the signpost;

a display means configured to display at least part of the digital map based on the data of the digital map included in the navigation database such that the at least part of the digital map includes the signpost with at least one of the text or the symbol of the signpost and the background of the signpost; and a processing means configured to determine a part of a map element of the digital map where no signpost shall be positioned or a vicinity around the map element in the digital map where no signpost shall be positioned, and display the signpost in the at least part of the digital map so that the predetermined part of the map element of the digital map where no signpost shall be positioned is not hidden by the signpost, or the predetermined vicinity around the map element in the digital map where no signpost shall be positioned is not hidden by the signpost.

19. A non-transitory computer-readable medium comprising a plurality of instructions for execution by a processor, the tangible computer-readable medium comprising:

instructions executable to display at least a part of a digital map;

instructions executable to detect a signpost along a calculated route in the part of the digital map;

instructions executable to retrieve at least one of a text or a symbol from a navigation database based on a vehicle position and a vehicle parameter related to a fuel level in the vehicle;

instructions executable to retrieve from the navigation database a background linked to the at least one of the text or the symbol, the background stored independently from the at least one of the text or the symbol in the navigation database; and instructions executable to construct and display a signpost image in the digital map based on the retrieved at least one of the text or the symbol and the background.

20. The non-transitory computer-readable medium of claim 19, further comprising:

instructions executable to display a map element in the digital map;

instructions executable to determine a position of the signpost image in the at least a part of the digital map with respect to the map element; and instructions executable to display the signpost image such that no overlap occurs with the map element.

21. The non-transitory computer-readable medium of claim 19, further comprising instructions executable to retrieve a data link from the navigation database based on the at least one of the text or the symbol, and retrieve the background based on the data link.

22. The non-transitory computer-readable medium of claim 19, further comprising instructions executable to retrieve a position data of the signpost from the navigation database, and display the signpost image based on the position data.

* * * * *